April 9, 1935.  P. J. FITZGERALD  1,997,413
SLICING AND SHREDDING DEVICE
Filed Dec. 6, 1932  2 Sheets-Sheet 1

WITNESS:

INVENTOR
Patrick J. Fitzgerald
BY
HIS ATTORNEY

April 9, 1935.   P. J. FITZGERALD   1,997,413
SLICING AND SHREDDING DEVICE
Filed Dec. 6, 1932   2 Sheets-Sheet 2
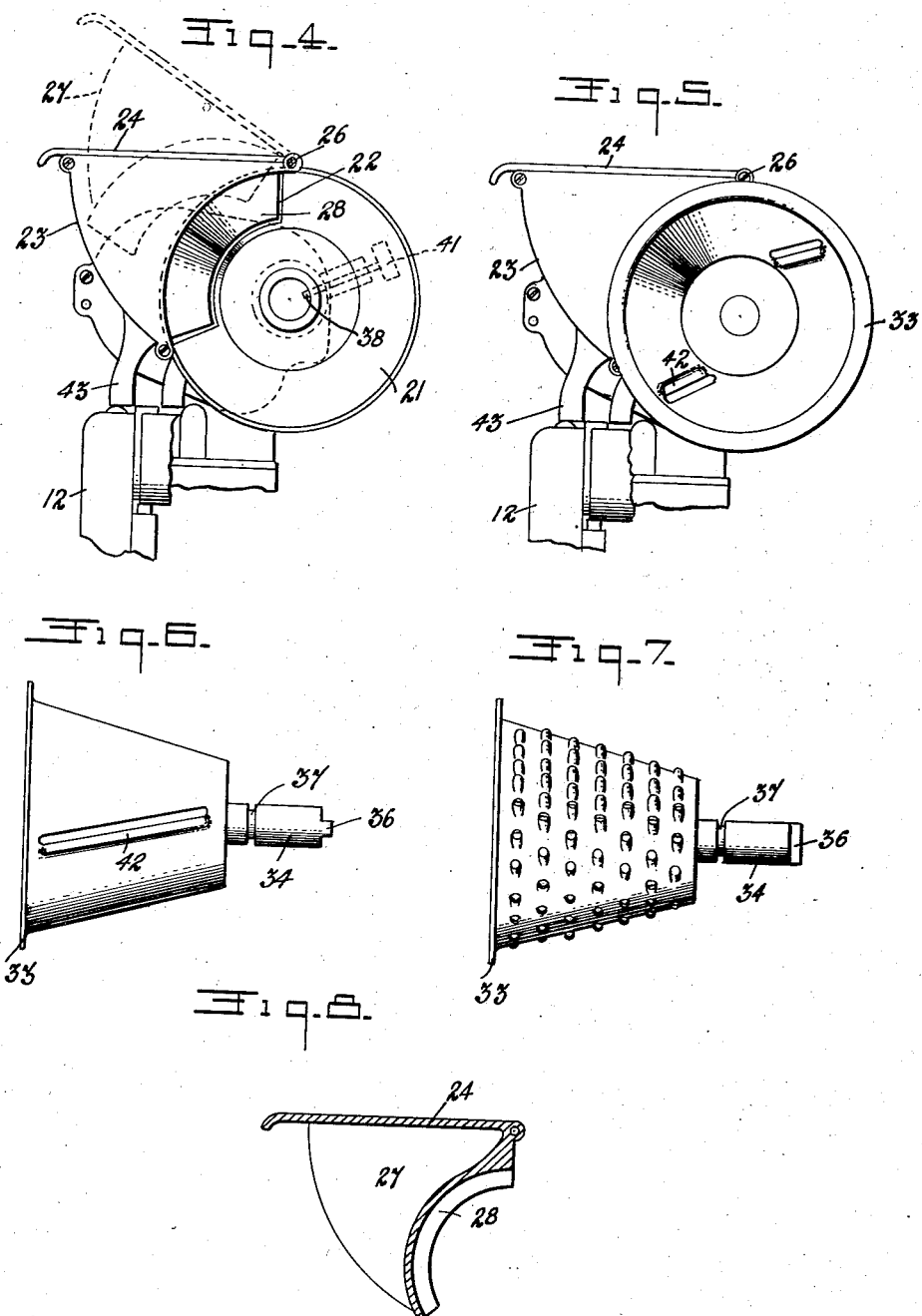
WITNESS:
OM Cook.
TB Humphries.
INVENTOR
Patrick J. Fitzgerald
BY
Joshua R. H. Potts
HIS ATTORNEY Patented Apr. 9, 1935

1,997,413

UNITED STATES PATENT OFFICE 1,997,413

SLICING AND SHREDDING DEVICE

Patrick J. Fitzgerald, Torrington, Conn., assignor to The Fitzgerald Mfg. Company, Torrington, Conn., a corporation of Connecticut Application December 6, 1932, Serial No. 645,929

2 Claims. (Cl. 287—1)

This invention relates to a slicing and shredding device, and particularly to such a device adapted for connection to a power unit for operating interchangeable implements used with said device.

In my United States application for Letters Patent entitled "Electrical utility device", filed April 12, 1932, Serial No. 604,844, there is shown and described a mixing and extracting machine, while in my application for United States Letters Patent, entitled "Power adapter", filed on even date herewith, Serial No. 645,928, there is shown and described a mechanism associated with the "electrical utility device" for providing a two speed unit adapted for the connection and driving of various implements for household use, and the subject-matter of this invention comprises a device or implement capable of such attachment, and for the purpose of slicing and shredding vegetables, fruits, etc.

The object of the present invention, therefore, is to provide a slicing and shredding device capable of attachment to a power unit for supporting the casing thereof, and driving the working implements.

According to the invention, the slicing and shredding device comprises a casing tapering towards its inner end and being provided at that inner end with a sleeve for attachment in a power unit, a working implement of substantially the same shape as the main portion of said casing and adapted to rotate in said casing by a shaft extending through said sleeve and means on the end of said shaft for coupling the said implement to a power take-off member.

Figure 1:
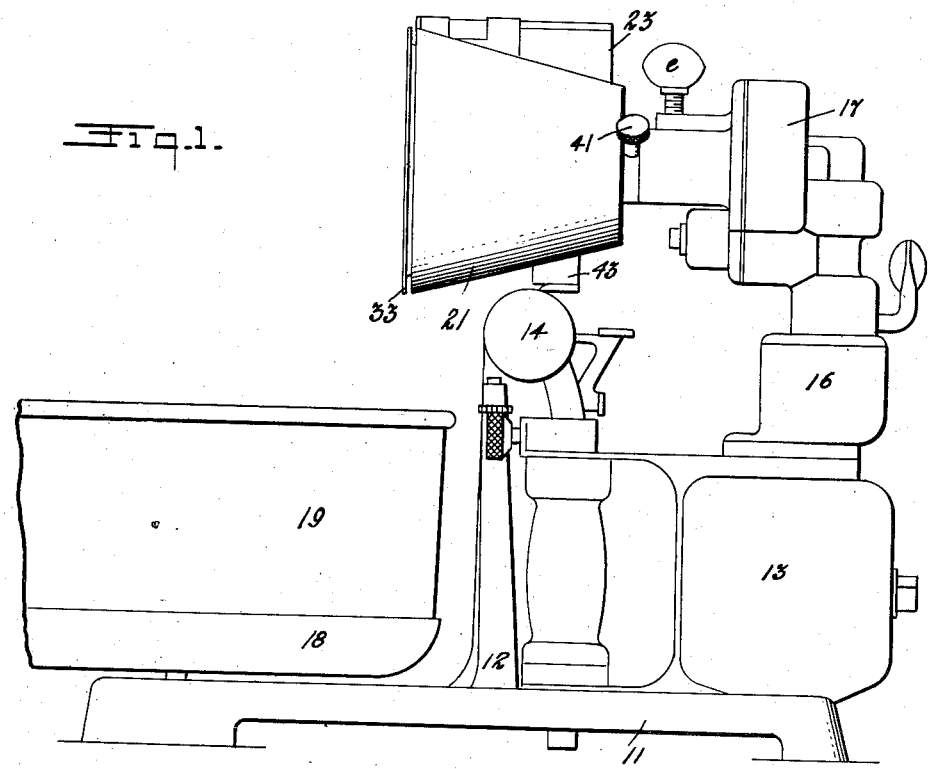

The drawings illustrate an embodiment of the invention and the views therein are as follows:

Figure 1 shows the electrical utility device and power adapter with the subject-matter of this invention operatively connected thereto.

Figure 2:
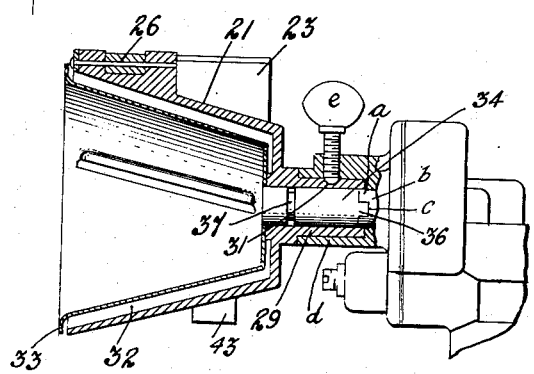
Figure 3:
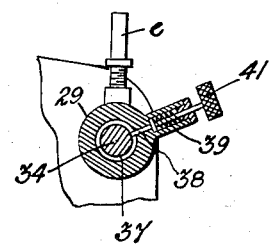

Figure 2 shows a vertical sectional view of the device when used as a slicer, and in which a portion of the power adapter has been sectioned to show the cooperative relation of the parts, Figure 3 is a fragmentary sectional view showing the means for holding the working implement against longitudinal movement, Figure 4 is a front elevation of the casing of the device with the power adapter fragmentarily shown and in this view the feed magazine closure has been dotted in to show same in an elevated position, Figure 5 is a similar view showing the slicing implement operatively associated with said casing, Figure 6 is a side elevation of the slicing implement, Figure 7 is a like view of the shredding implement, and Figure 8 is a vertical sectional view of the magazine cover and pressure plate.

As shown in Figure 1, the electrical utility device comprises a base 11 having a standard 12 and a motor 13 pivotally mounted on the standard at 14. The motor is provided with a gear box 16 and a power adapter 17.

In the application of the power adapter, above mentioned, there is described a pair of power take-off members having different speeds, and one of which is shown in Figure 2 and identified by the character $a$. This take-off member is in the form of a shaft $b$ having its end slotted at $c$. Surrounding this take-off member is a collar $d$ provided at its upper end with a winged screw $e$, the purpose of which will be later explained.

The electrical utility device is also provided with a turntable 18 for supporting a bowl or vessel 19, and while that particular arrangement forms part of the equipment for the machine when used as a mixing device, it may be utilized for catching the sliced and shredded material which is discharged from the slicing and shredding device.

The slicing and shredding device comprises a casing 21 whose interior is substantially in the shape of a truncated cone with a cut-out portion 22 communicating with a feed magazine 23. This feed magazine is substantially V-shaped in cross-section, its wall and cover being substantially tangential to the conical part of said casing, and this cover 24 which, when closed, is horizontally disposed, is hinged at 26 and has an integrally formed rib 27 on the lower face of the same and an integrally formed pressure plate 28 which, when the cover is closed, substantially closes the opening 22 at the bottom of said magazine.

This casing forms the subject-matter of a design application filed on even date herewith, Serial No. 46,313, Design Patent No. 89,424.

The inner end of the casing terminates in a sleeve 29 which fits into the collar $d$ of the power adapter (see Figure 2), and the sleeve is provided with an indentation 31 for receiving the end of the winged screw $e$ in order that the casing may be held against accidental dislodgment and in a position where the magazine cover 24 will be horizontally disposed.

The working implements for cooperation with said casing are shaped substantially the same as the inside of the casing, and provide clearances 32, while their outer end has an annular flange 33.

The inner end is provided with a shaft 34 whose end is machined to provide a transverse rib 36 which fits into the slot c of the power take-off.

The shaft 34 is also provided with an annular groove 37, while the casing is provided with a pin 38 which, urged by a spring 39, extends at all times into the interior of the sleeve 29, and is drawn therefrom to permit the shaft to be thrust into said sleeve by means of the thumb piece 41.

The pin 38 is so located that when the transverse rib 36 enters the slot c on the end of the power take-off, it will be directly opposite the groove 37, and when the thumb piece 41 is released, the spring 39 will urge the pin into said groove and thereby hold the working implement against longitudinal movement.

The slicer shown in Figure 6 has struck up blades 42 which are disposed angularly to the casing wall so as to provide a slanting cut on the article being sliced.

This will greatly facilitate the action of the cutting and will give a clean cut without any tearing or pulling of the article, while a gentle pressure on the raised magazine cover will press the pressure plate 28 against the article being acted upon so as to prevent its being moved away from the blades of the implement.

The location of the feed magazine is such that the articles to be acted upon by the implements are presented practically tangential to the face of the implement, thereby facilitating the work of the implement.

The casing is provided with supporting lugs or legs 43, but these may be changed to accommodate the type of power unit with which the device is used.

Of course, the slicing and shredding device illustrated may be modified in many ways without departing from the invention herein set forth and hereafter claimed.

The invention is hereby claimed as follows:

1. In a slicing and shredding device, a power take-off shaft, a sleeve embracing said shaft in part, means to lock the sleeve removably in such embracing position, an auxiliary shaft journaled in said sleeve in axially aligned operative connection with the power take-off shaft, means independent of the sleeve-locking means to engage and maintain the auxiliary shaft removably journaled within the sleeve, and an implement permanently connected to and removable with the auxiliary shaft, said auxiliary shaft being the sole support and journaling of said implement.

2. In a slicing and shredding device, a power take-off shaft, a sleeve embracing said shaft in part, means to lock the sleeve removably in such embracing position, an auxiliary shaft journaled in said sleeve in axially aligned operative connection with the power take-off shaft, means adjacent to but independent of the sleeve-locking means to engage and maintain the auxiliary shaft removably journaled within the sleeve, and an implement permanently connected to and removable with the auxiliary shaft, said auxiliary shaft being the sole support and journaling of said implement.

PATRICK J. FITZGERALD.